United States Patent
Wei et al.

(10) Patent No.: US 11,609,165 B2
(45) Date of Patent: Mar. 21, 2023

(54) MATERIAL PERFORMANCE TESTING SYSTEM UNDER FIXED MULTI-FIELD COUPLING EFFECT IN HYPERGRAVITY ENVIRONMENT

(71) Applicant: ZHEJIANG UNIVERSITY, Zhejiang (CN)

(72) Inventors: Hua Wei, Zhejiang (CN); Jiangwei Wang, Zhejiang (CN); Weian Lin, Zhejiang (CN); Ze Zhang, Zhejiang (CN); Yunmin Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 413 days.

(21) Appl. No.: 17/040,997

(22) PCT Filed: Oct. 9, 2019

(86) PCT No.: PCT/CN2019/110030
§ 371 (c)(1),
(2) Date: Sep. 24, 2020

(87) PCT Pub. No.: WO2020/252983
PCT Pub. Date: Dec. 24, 2020

(65) Prior Publication Data
US 2022/0268676 A1    Aug. 25, 2022

(30) Foreign Application Priority Data

Jun. 20, 2019  (CN) .......................... 201910538193.9

(51) Int. Cl.
*G01N 3/18* (2006.01)
*G01N 3/02* (2006.01)

(52) U.S. Cl.
CPC ................ *G01N 3/18* (2013.01); *G01N 3/02* (2013.01); *G01N 2203/0019* (2013.01); *G01N 2203/0226* (2013.01)

(58) Field of Classification Search
CPC . G01N 11/14; G01N 3/18; G01N 3/02; G01N 2203/0019; G01N 2203/0226;
(Continued)

(56) References Cited

U.S. PATENT DOCUMENTS

2006/0120431 A1   6/2006  Monceau et al.

FOREIGN PATENT DOCUMENTS

CN   101571476   11/2009
CN   104897476    9/2015
(Continued)

OTHER PUBLICATIONS

"International Search Report (Form PCT/ISA/210) of PCT/CN2019/110030," dated Mar. 19, 2020, pp. 1-5.

*Primary Examiner* — Brandi N Hopkins
(74) *Attorney, Agent, or Firm* — JCIP Global Inc.

(57) ABSTRACT

Provided is a material performance testing system under a fixed multi-field coupling effect in a hypergravity environment, including a hoisted sealed cabin, a bearing frame, a high-temperature furnace, a mechanical test device, and a buffer device. The bearing frame and the high-temperature furnace are fixedly mounted inside the hoisted sealed cabin. The bearing frame is covered on the high-temperature furnace. The buffer device is mounted at a bottom of the high-temperature furnace. Upper and lower ends of the mechanical test device are connected in a top of the bearing frame and the bottom of the high-temperature furnace. A sample is connected and mounted at an end of the mechanical test device.

9 Claims, 7 Drawing Sheets

(58) Field of Classification Search
CPC ...... C21D 9/00; G01M 3/2869; G01M 3/329; G01M 15/14
See application file for complete search history.

(56) References Cited

FOREIGN PATENT DOCUMENTS

| | | | |
|---|---|---|---|
| CN | 206095591 | 4/2017 | |
| CN | 207423697 | 5/2018 | |
| CN | 109798771 | 5/2019 | |
| CN | 110006741 | 7/2019 | |
| CN | 110243181 | 9/2019 | |
| CN | 110252431 | 9/2019 | |
| CN | 110252431 A * | 9/2019 | |
| CN | 110261216 | 9/2019 | |
| CN | 110261238 | 9/2019 | |
| CN | 111487139 A * | 8/2020 | ............... G01B 7/18 |
| WO | WO-2020252984 A1 * | 12/2020 | |

* cited by examiner

MATERIAL PERFORMANCE TESTING SYSTEM UNDER FIXED MULTI-FIELD COUPLING EFFECT IN HYPERGRAVITY ENVIRONMENT

CROSS-REFERENCE TO RELATED APPLICATION

This application is a 371 of international application of PCT application serial no. PCT/CN2019/110030, filed on Oct. 9, 2019, which claims the priority benefit of China application no. 201910538193.9, filed on Jun. 20, 2019. The entirety of each of the above mentioned patent applications is hereby incorporated by reference herein and made a part of this specification.

BACKGROUND OF THE INVENTION

Field of the Invention

The invention relates to the technical field of material performance testing, in particular to a material performance testing system under fixed volume force-surface force-temperature coupling effect in a hypergravity environment.

Description of Related Art

As the thrust-to-weight ratio of modern aviation engines is increased and the number of turbine stages is reduced, the front gas inlet temperature of the turbine is developed from 1400 K to 1500 K in the 1970s to 1600 K to 1750 K at the beginning of this century. The front gas inlet temperature of the turbine of an engine with a thrust-to-weight ratio of 12 to 15 will be as high as 2000 K to 2200 K, which puts higher performance requirements on the core hot end components of the engine. The high-pressure turbine working blade is one of the key components of the hot end components, which during service, is operated for a long time under coupled loading conditions such as high temperature, high pressure, high rotation speed, and alternating load.

During service, the turbine working blade is rotated at a high speed around the axis of the engine. The function thereof is to do work via gas expansion, converting the potential energy and heat energy of the gas into the mechanical work of the rotor. Therefore, the turbine working blade mainly bears the coupling effect of centrifugal load, thermal load, aerodynamic load, and vibration load during service. The centrifugal stress generated by the centrifugal load belongs to volume force, and a bending and torsion structure blade for which the stacking line and the radial line are not completely coincided with produces radial tensile stress, torsional stress, and bending stress at the same time. The thermal stress generated by the thermal load is closely related to geometric constraints. The more geometric constraints, the greater the thermal stress, especially the stress concentration at the gas film hole, thus significantly reducing the fatigue life of the blade. The aerodynamic force generated by the aerodynamic load is a surface distributed pressure, which is an area force and acts on each surface of the blade and is unevenly distributed along the height and width directions of the blade. Therefore, under the coupling effect of radial tensile stress, torsional stress, bending stress, and thermal stress, the turbine working blade simultaneously undergoes shear deformation, tensile deformation, and torsional deformation, which is obviously different from the deformation behavior of the laboratory under uniaxial stress.

Atomic solid-phase diffusion is the root cause of the evolution of microstructure during the service of a material. The dynamic coupling of volume force-surface force-temperature generated by the high-speed rotation of the blade significantly increases the diffusion rate of an atom at an interface, a dislocation, a void, and other defects, so that the microstructure evolution thereof is different from that of the axial surface force effect. At the same time, due to different elastic moduli, thermal expansions, etc. of precipitation phases at different densities under hypergravity effect, complex and incompatible plastic deformation is produced between each precipitation phase, thus further increasing the driving force of the relative motion between substances with different densities. Therefore, huge internal stress is generated inside the material, such that the damage mechanism of the material is significantly different from the damage mechanism of the material under the effect of surface force.

SUMMARY OF THE INVENTION

In order to solve the issue of testing the dynamic performance of a material under the volume force-surface force-temperature coupling effect under high-speed rotation state, the invention firstly provides a material performance testing system under a fixed volume force-surface force-temperature coupling effect in a hypergravity environment. The testing system is easy to assemble, convenient to use, and has a high safety factor, and is also used for material performance testing in a hypergravity condition. The device is suitable for a 1 g to 2500 g hypergravity environment, the temperature is from room temperature to 1600° C., and the maximum surface force provided is 300 kN.

The invention solves the key issue of high-temperature mechanical performance testing of a material under a high-speed rotation state. With this device, with the help of hypergravity environment, the mechanical performance data of a material in a volume force-surface force-temperature coupling environment may be obtained in real time.

The technical solution adopted by the invention:

The invention includes a hoisted sealed cabin, a bearing frame, a high-temperature furnace, a mechanical test device, and a buffer device. The bearing frame and the high-temperature furnace are fixedly mounted inside the hoisted sealed cabin. The bearing frame is covered on the high-temperature furnace. The buffer device is mounted at a bottom in the high-temperature furnace. An upper end and a lower end of the mechanical test device are connected in a top of the bearing frame and the bottom of the high-temperature furnace. A sample 6 is connected and mounted at an end of the mechanical test device.

The hoisted sealed cabin includes an upper sealing dome and a hoisted sealed cavity. A cavity is provided inside the hoisted sealed cavity. An opening is formed at an upper end of the cavity. Sidewalls on both sides of the hoisted sealed cavity are connected outward with a cabin lug. Cabin lugs on both sides are hingedly connected to a rotating arm of a hanging basket of a hypergravity centrifuge. The upper sealing dome is connected to an opening end surface of the cavity of the hoisted sealed cavity via bolt mounting and is connected by sealing. A cabin interface member is mounted in a center of the upper sealing dome. The cabin interface member specifically includes an upper glass press-fit flange, an upper flange fastening screw, a quartz glass, and a vacuum socket. The quartz glass is fixed and mounted at an opening of a center at a top of a communication upper sealing cabin cover via the upper glass press-fit flange. The upper glass press-fit flange is fixed to the top of the upper sealing cabin cover by an upper flange fastening screw, the communication upper sealing cabin cover, an opening is formed at a bottom of a communication cabin, and a vacuum socket is mounted at the opening.

A second screw hole is provided at an outer edge of the upper sealing dome, and a bolt passes through the second screw hole to be connected to the hoisted sealed cavity, so that the upper sealing dome is connected to the hoisted sealed cavity.

A plurality of spaced fixing holes are provided on a surface of a lug portion of cabin lugs extended radially. The bolt passes through the fixing holes to be connected to the rotating arm of the hypergravity centrifuge, so that the cabin lugs are connected to the rotating arm of the hypergravity centrifuge via the fixing holes and the bolt.

An outer sidewall of the hoisted sealed cavity is provided with a vacuum interface, and the vacuum interface is directly connected to a vacuum pipeline outside the hoisted sealed cabin. A wiring bracket is fixedly mounted at a bottom surface in the cavity of the hoisted sealed cavity. A vacuum interface, a wiring hole, and a mounting hole are provided on the outer sidewall of the hoisted sealed cavity. A wiring level is mounted at the wiring hole. The wiring level is connected to the wiring bracket on the inside of the hoisted sealed cavity via the wiring hole. A weak signal control wire is connected to the wiring bracket via the mounting hole.

The bearing frame has a circular arc boss structure and is mounted on an inside the hoisted sealed cabin. A stepped surface is machined on an inner wall of hoisted sealed cabin. An outer edge of the bearing frame is fixed on the stepped surface by a bolt and is covered above the high-temperature furnace.

The high-temperature furnace is fixed in a hypergravity test cabin. The high-temperature furnace includes an upper furnace, a middle furnace, a lower furnace, a heat insulation layer, a high-strength furnace tube, a heating element, and a furnace carrier arranged in order from top to bottom. The upper furnace is mainly composed of an upper heat insulation cover, an upper cavity outer casing, an upper cavity middle casing, an upper cavity heat insulation layer, and an upper cavity lower fixing cover. The upper cavity outer casing, the upper cavity middle casing, and the upper cavity heat insulation layer are respectively mounted from the outside to the inside to form an upper furnace three-layer structure. The upper heat insulation cover and the upper cavity lower fixing cover are respectively mounted on an upper end and a lower end of the upper furnace three-layer structure so that the upper furnace three-layer structure is fixedly connected. There is a gap both between the upper cavity outer casing and the upper cavity middle casing and between the upper cavity middle casing and the upper cavity heat insulation layer as an air heat insulation layer. The middle furnace is mainly composed of a middle heat insulation cover, a middle cavity outer casing, a middle cavity middle casing, a middle cavity heat insulation layer, and a middle cavity lower fixing cover. The middle cavity outer casing, the middle cavity middle casing, and the middle cavity heat insulation layer are respectively mounted from the outside to the inside to form a middle furnace three-layer structure. The middle heat insulation cover and the middle cavity lower fixing cover are respectively mounted on an upper end and a lower end of the middle furnace three-layer structure so that the middle furnace three-layer structure is fixedly connected. There is a gap both between the middle cavity outer casing and the middle cavity middle casing and between the middle cavity middle casing and the middle cavity heat insulation layer as an air heat insulation layer.

The upper cavity lower fixing cover of the upper furnace and the middle heat insulation cover of the middle furnace are fixedly connected. The lower furnace is mainly composed of a lower heat insulation cover, a lower cavity outer casing, a lower cavity middle casing, a lower cavity heat insulation layer, and a lower cavity lower fixing cover. The lower cavity outer casing, the lower cavity middle casing, and the lower cavity heat insulation layer are respectively mounted from the outside to the inside to form a lower furnace three-layer structure. The lower heat insulation cover and the lower cavity lower fixing cover are respectively mounted on an upper end and a lower end of the lower furnace three-layer structure so that the lower furnace three-layer structure is fixedly connected. There is a gap both between the lower cavity outer casing and the lower cavity middle casing and between the lower cavity middle casing and the lower cavity heat insulation layer as an air heat insulation layer. The middle cavity lower fixing cover of the middle furnace and the lower heat insulation cover of the lower furnace are fixedly connected. The furnace carrier is disposed at a bottom of the lower cavity heat insulation layer of the lower furnace. The high-strength furnace tube is disposed on the furnace carrier. A heat insulation layer is respectively filled between an outside of the high-strength furnace tube and the upper cavity heat insulation layer of the upper furnace, the middle cavity heat insulation layer of the middle furnace, and the lower cavity heat heat insulation layer of the lower furnace. A spiral groove is machined on an inside of the high-strength furnace tube. The spiral groove is provided with a spiral heating element. The spiral groove is provided with a heat dissipation channel on a side facing an inner wall of the high-strength furnace tube, and a heat generated by the heating element is uniformly radiated to a center of high-strength furnace tube via the heat dissipation channel.

The mechanical test device is disposed in a hypergravity test cabin. The mechanical test device includes a tie-rod, a fixed wire structure, a chuck, a thermocouple, a tightening nut, and a surface force loading block. A top of the tie-rod is fixedly connected to a center of the top of the bearing frame in the hoisted sealed cabin. The tie-rod is mainly used to withstand a tensile stress generated by a volume force and surface force coupling effect during a material performance test. A bottom end of the tie-rod is connected to an upper end of the sample via the chuck. The sample is a sample of mechanical performance of a material to be tested. A lower end of the sample is provided with an external thread. The external thread at the lower end of the sample is screwed into a threaded hole of the surface force loading block and fastened and connected by the tightening nut. The surface force loading block is specifically a block structure with adjustable own weight. Different surface forces are applied to the sample via the surface force loading block of a different weight combined with a centrifugal force of a centrifuge at a different rotation speed. A lower end surface of the surface force loading block is disposed on a buffer device. The buffer device is disposed at a bottom of the hypergravity test cabin. Detection ends of three thermocouples are welded at different positions of the sample. Strain gauges are mounted and welded on the sample. Output ends of the three thermocouples and strain gauges are led out by a wire and connected to an external signal collector. A plurality of fixed wire structures are mounted in a middle of the tie-rod. The wire is led out via a fixed wire structure and fixed in position. A lower portion of the tie-rod and the sample are disposed in the high-strength furnace tube of the high-temperature furnace. The surface force loading block is extended through the high-strength furnace tube of the high-temperature furnace into the buffer device.

The fixed wire structure includes a first fixing ring, a second fixing ring, a fixed porcelain seat, and a porcelain seat protector. Both the first fixing ring and the second fixing ring have a semi-circular gap, and the first fixing ring and the second fixing ring are connected to each other between the semi-circular gaps to form a circular opening sleeved outside the tie-rod. The porcelain seat protector is fixed to a side surface of the second fixing ring by a bolt. A fixed porcelain seat is interposed between the porcelain seat protector and the second fixing ring. The fixed porcelain seat is provided with a hole for an output wire of the thermocouple and the strain gauges to pass through.

An upper end surface and a lower end surface of the chuck are provided with a threaded hole. An external thread of the bottom end of the tie-rod is screwed into the threaded hole of the upper end surface of the chuck connected thereto. The sample also has an external thread at the upper end. The external thread of the upper end of the sample is screwed into the threaded hole of the upper end surface of the chuck connected thereto.

A top end of the tie-rod is provided with an outer flange. A fixing screw hole for connecting the bearing device of the material mechanical performance test cabin is provided on the outer flange. A bolt passes through the fixing screw hole to fix the top end of the tie-rod to the bearing device of the material mechanical performance test cabin.

The volume force-surface force-temperature coupling effect is shown in FIG. 11. During an experiment, under a rotation of a hypergravity centrifuge, the sample 6 generates centrifugal forces $F_1$ and $F_{shear\ stress}$ via its own weight, and a surface force loading block 4-5 applies a constant radial tensile stress $F_2$, that is, an area force, to the sample 6 under centrifugal force effect. A rotation speed of the hypergravity centrifuge is changed, and volume forces $F_1$ and $F_{bending\ stress}$ are changed; a weight of the surface force loading block 4-5 is changed, and the area force $F_2$ is changed.

A mechanical test device 4 is disposed in a high-temperature furnace 3, and a temperature load is applied to a sample, thus forming a volume force-surface force-temperature coupling effect material performance testing environment, and a working principle is shown in FIG. 11.

A sample material performance test process under a suspended volume force-surface force-temperature coupling effect in hypergravity environment is completed under the requirements of high temperature resistance, special atmosphere environment, and hypergravity, etc. Considering an operating environment of a device, a test device designed by the invention solves a technical impact brought by hypergravity, conforms to a concept of high-strength and lightweight, has a modular structure design, a short test preparation period, and a safe and reliable test process.

The technical features and advantages of the invention:

The invention has the ability to simulate a service environment of a high-speed rotating device such as an aero engine, an aerospace engine, a gas turbine, etc. That is, in the process of simulating high-speed rotation, in addition to high-temperature gas erosion and temperature change of engine starting and shutdown cycle, the sample also needs to bear centrifugal stress and axial dynamic load generated by high-speed rotation.

In particular, the centrifugal stress $\sigma(r)=\int_r^{rtip}\overline{\rho\omega^2}\,dr$ ($\rho$ is density, $\omega$ is rotation speed, r is radius of rotation, and rtip is radius of curvature of blade tip) generated by the sample's own weight under high-speed rotation is zero at the sample tip cross section, and is gradually increased along an axis of rotation direction of the sample. A centrifugal tensile stress at a root cross section of the sample is the largest, thereby generating an extremely high centrifugal stress gradient inside the sample. If a shape of the sample is complicated, then a connection line of a center of gravity of each cross section of the sample is not completely coincided with the axis of rotation. During rotation, in addition to the centrifugal force, the sample also bears a huge centrifugal bending moment. Therefore, the invention may simulate a real stress state during a service process of high-speed rotating parts, that is, a stress state under a dynamic coupling environment of various stresses such as centrifugal stress generated by the weight of the sample itself, thermal stress, vibration stress, and shear stress generated by torque, so as to achieve the ability to test the performance of a material under complex stress conditions.

The features of the invention are:
(1) A device may work in 1 g to 2500 g hypergravity environment.
(2) An experimental temperature of a high-temperature furnace is from room temperature to 1600° C.
(3) A maximum surface force provided by the device is 300 kN.
(4) During a mechanical performance testing of a material, a centrifugal host rotates a sample to generate centrifugal force via a weight of the sample itself. A surface force loading block applies a constant radial tensile stress on the sample under centrifugal force effect, namely an area force. A rotating speed of the centrifugal host is changed and a volume force is changed. A surface force loading block weight is changed to change the area force applied on the sample.
(5) According to a filament type of the high-temperature furnace, a high-temperature test environment of room temperature to 1600° C. may be realized.

Figure 1:
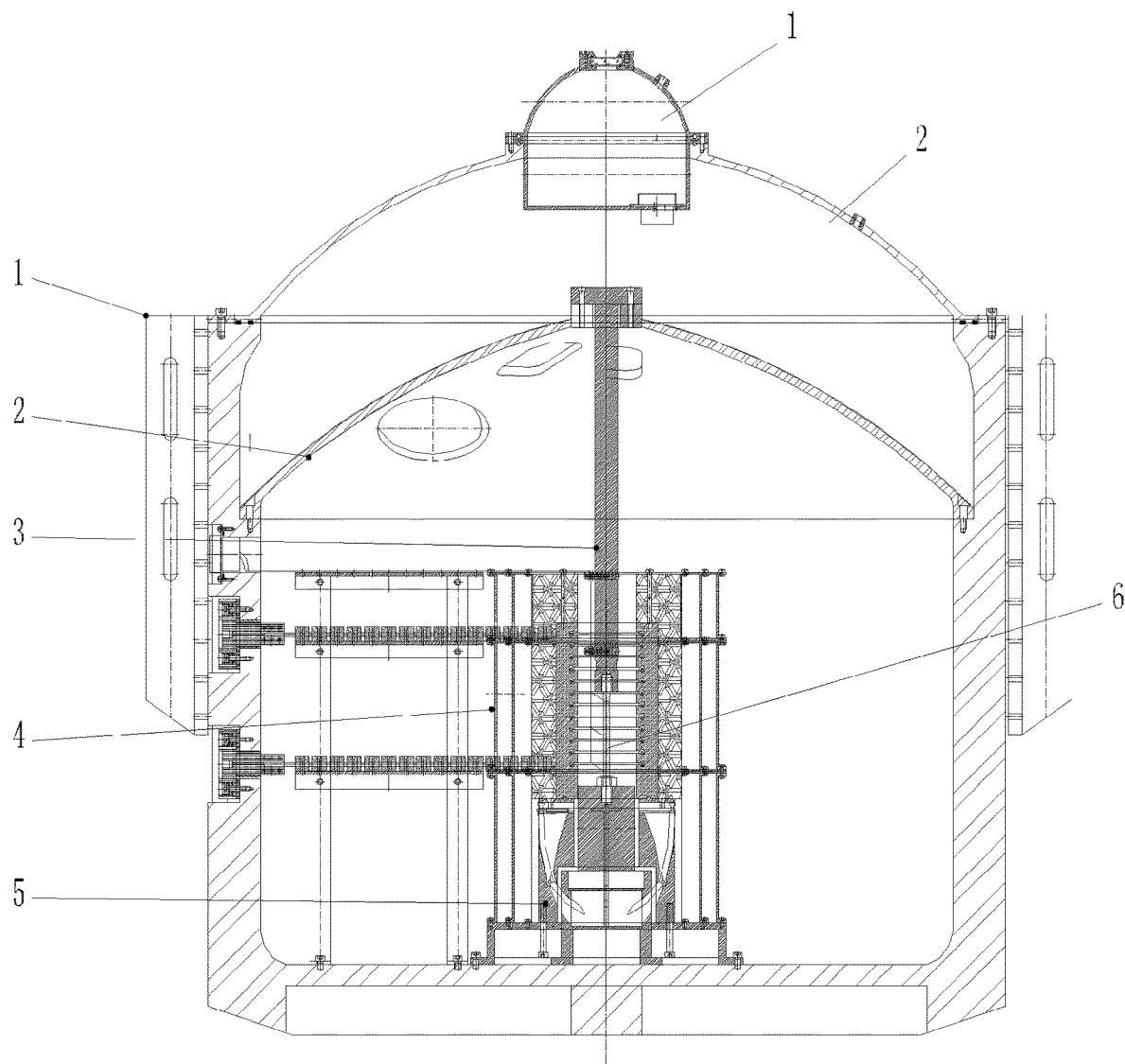
FIG. 1 is an overall structure diagram of a material performance testing system of the invention.

In the figures: hoisted sealed cabin 1, bearing frame 2, high-temperature furnace 3, mechanical test device 4, buffer device 5, sample 6, cabin interface member 11-1, upper sealing dome 11-2, cabin lug 11-3, vacuum interface 11-4, wiring electrical level 15, wiring bracket 16, hoisted sealed cavity 11-7, upper heat insulation cover 31, upper cavity outer casing 32, upper cavity middle casing 33, upper cavity heat insulation layer 34, upper cavity lower fixing cover 35, middle heat insulation cover 36, middle cavity outer casing 37, middle cavity middle casing 38, middle cavity heat insulation layer 39, middle cavity lower fixing cover 310, lower heat insulation cover 311, lower cavity outer casing 312, lower cavity middle casing 313, lower cavity heat insulation layer 314, lower cavity lower fixing cover 315, heat insulation layer 316, high-strength furnace tube 317, heating element 318, furnace carrier 319, tie-rod 41, fixed wire structure 42, chuck 43, thermocouple 44, tightening nut 46, surface force loading block 47, first fixing ring 43-1, second fixing ring 43-2, fixed porcelain seat 43-3, porcelain seat protector 43-4.

DESCRIPTION OF THE EMBODIMENTS

The invention is further described below with reference to the figures and embodiments.

As shown in FIG. 1, a specifically implemented system includes a hoisted sealed cabin 1, a bearing frame 2, a high-temperature furnace 3, a mechanical test device 4, and a buffer device 5; the bearing frame 2 and the high-temperature furnace 3 are fixedly mounted on an inside of the hoisted sealed cabin 1, the bearing frame 2 is covered on the high-temperature furnace 3, the buffer device 5 is mounted at a bottom in the high-temperature furnace 3, an upper end and a lower end of the mechanical test device 4 are connected in a top of the bearing frame 2 and the bottom of the high-temperature furnace 3, and a sample 6 is connected and mounted to an end of the mechanical test device 4.

Figure 2:
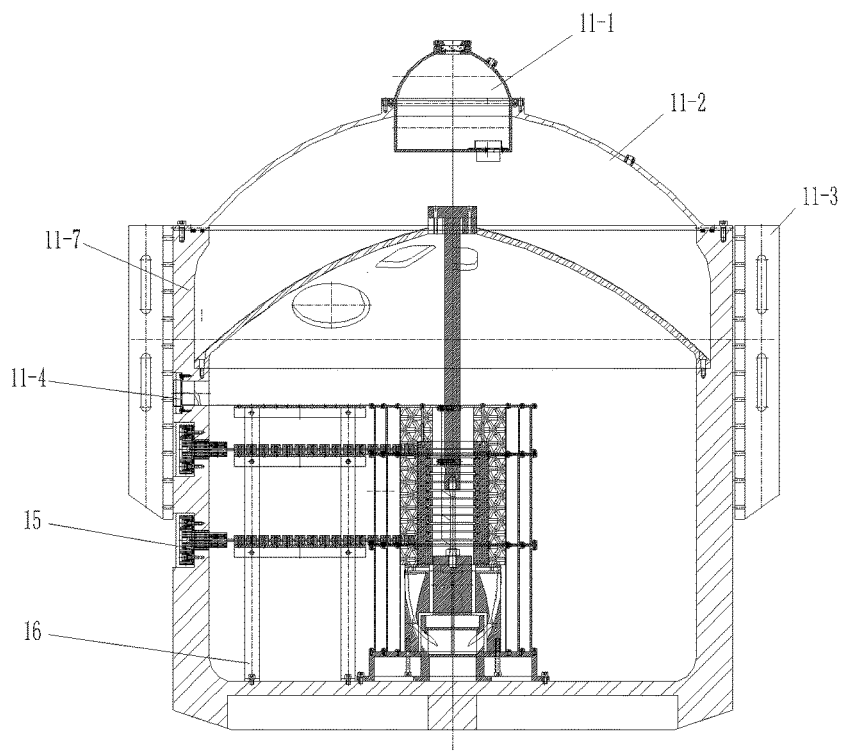
FIG. 2 is an overall cross-sectional view of a hoisted sealed cabin 1 of the invention used as a fixed experimental cabin.

The specific implementation system is:

The hoisted sealed cabin 1 provides a sealed carrier for a volume force-surface force-temperature coupling environment. As shown in FIG. 2, the hoisted sealed cabin 1 includes an upper sealing dome 11-2 and a hoisted sealed cavity 11-7. The hoisted sealed cavity 11-7 is provided with a cavity on the inside. An opening is formed at an upper end of the cavity, and a cabin lug 11-3 is outwardly connected to sidewalls on both sides of the hoisted sealed cavity 11-7. The cabin lugs on both sides are hingedly connected to a rotating arm of a hanging basket of a hypergravity centrifuge. The upper sealing dome 11-2 is connected to an opening end surface of the cavity of the hoisted sealed cavity 11-7 via bolt mounting and is connected by sealing. The hoisted sealed cavity 11-7 and the upper sealing dome 11-2 are sealed with double-layer fluorine rubber to improve sealing.

The hoisted sealed cabin 1 provides a sealed carrier for a volume force-surface force-temperature coupling environment. The hoisted sealed cabin 1 is connected to the hypergravity centrifuge via the cabin lug to ensure the stable operation of the internal structure during the experiment. According to the standard design of a pressure vessel under a high G value, in order to meet the strength requirements under hypergravity, a light-weight high-strength material is selected for the material of the hoisted sealed cavity 11-7, the light-weight high-strength material is specifically TC4 titanium alloy, and a surface of the cavity is electro-polished.

Figure 5:
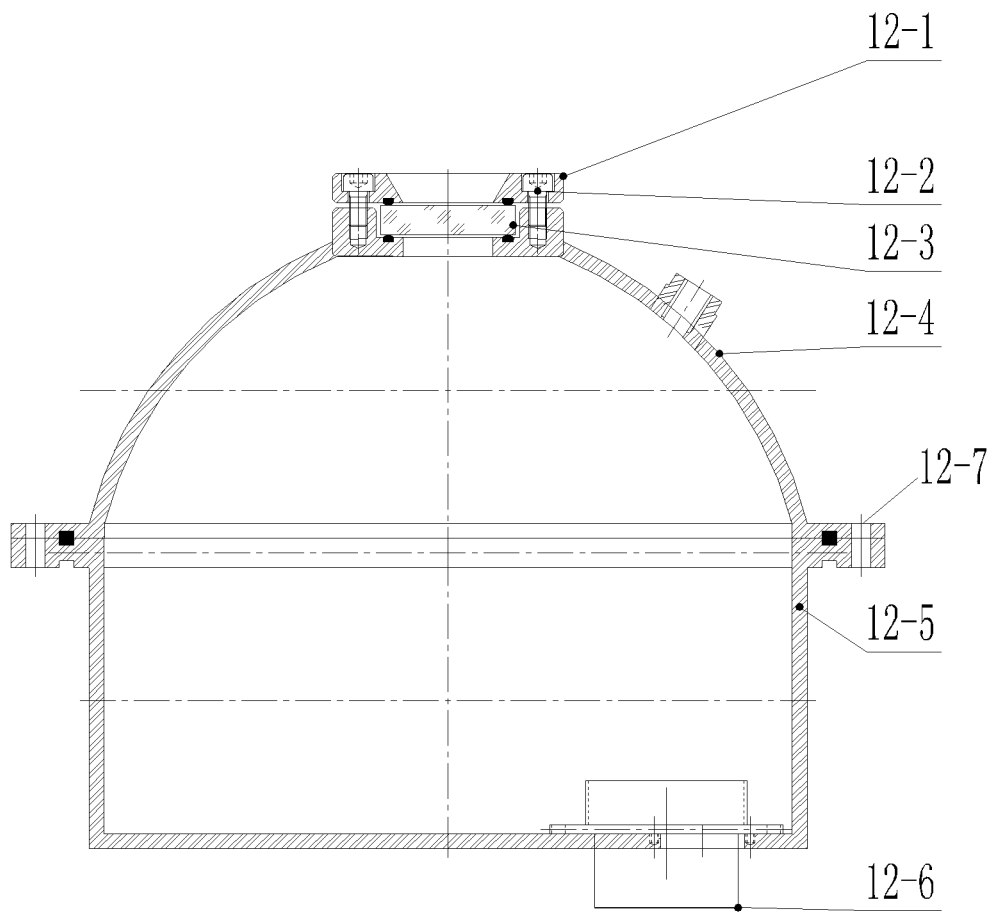
FIG. 5 is a front view of a cabin interface member 11-1.

A cabin interface member 11-1 is mounted in a center of the upper sealing dome 11-2. The cabin interface member 11-1 is used to be connected to a vacuum pipeline, a strong-current wire, and a weak signal wire introduced via a centrifuge rotating wall. As shown in FIG. 5, the cabin interface member 11-1 specifically includes an upper glass press-fit flange 12-1, an upper flange fastening screw 12-2, a quartz glass 12-3, and a vacuum socket 12-6. The quartz glass 12-3 is fixedly mounted by the upper glass press-fit flange 12-1 at an opening of a center of a top of a communication upper seal cabin cover 12-4. The upper glass press-fit flange 12-1 is fixed to a top of the upper seal cabin cover 12-4 via the upper flange fastening screw 12-2, the communication upper seal cabin cover 12-4, an opening is formed at a bottom of a communication cabin 12-5, and the vacuum socket 12-6 is mounted at the opening. The quartz glass 12-3 is used to visually observe a condition in the hoisted sealed cabin 1. The vacuum socket 12-6 is used to connect the vacuum pipeline introduced via the centrifuge rotating wall.

A second screw hole is provided at an outer edge of the upper sealing dome 11-2, and a bolt passes through the second screw hole to be connected to the hoisted sealed cavity 11-7, so that the upper sealing dome 11-2 is connected to the hoisted sealed cavity 11-7.

Figure 3:
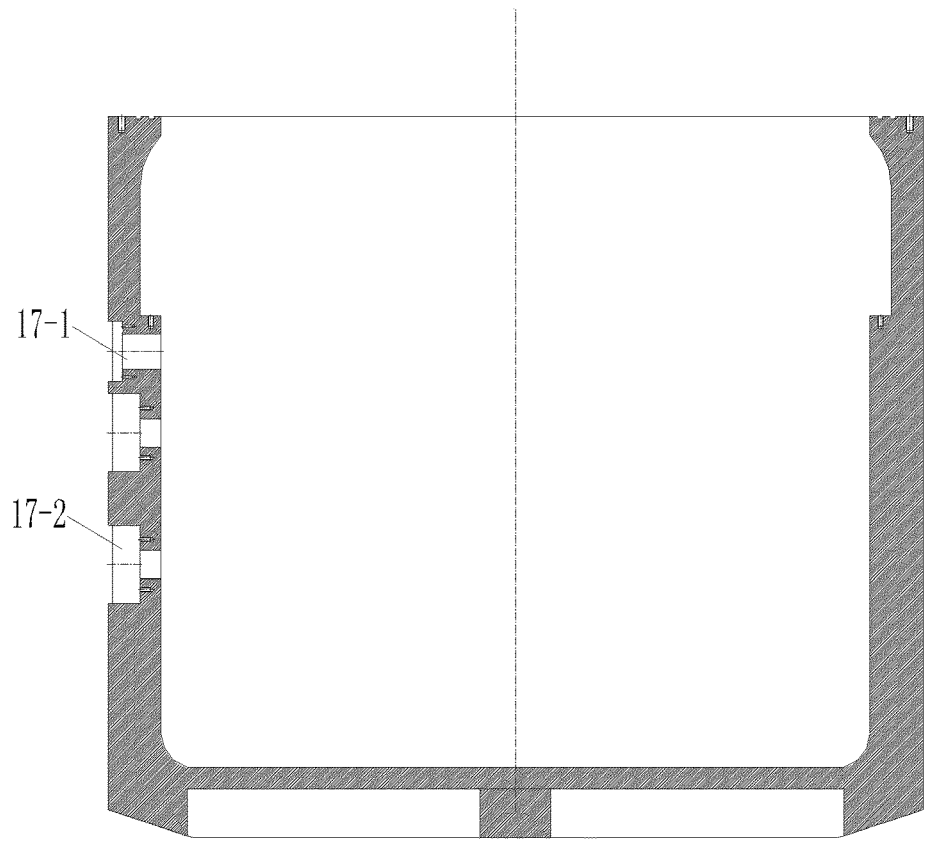
FIG. 3 is a diagram of a hoisted sealed cavity 11-7.
Figure 4:
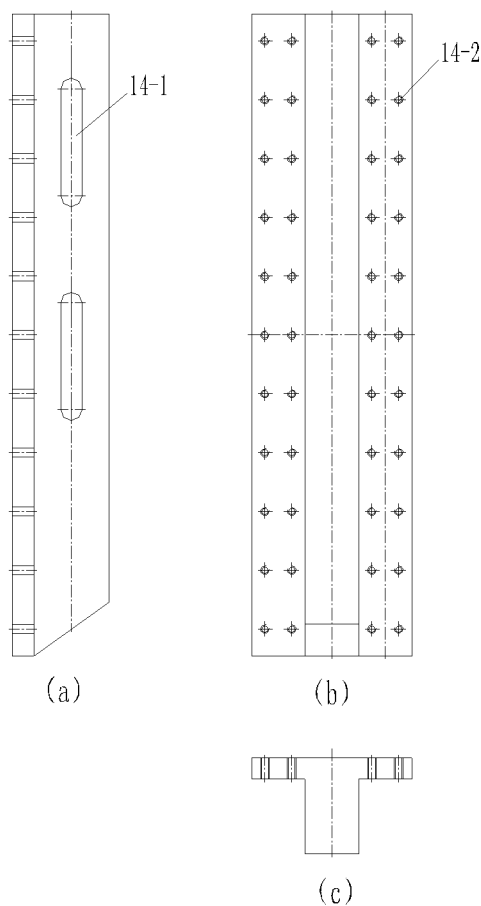
FIG. 4 is a diagram of a cabin lug 3.

As shown in FIG. 4, the cabin lug 11-3 has a T-pillar structure, and a plurality of spaced fixing holes 14-1 are provided on a surface of radially-extended lugs. The bolt passes through the fixing holes 14-1 to be connected to the rotating arm of the hypergravity centrifuge, so that the cabin lug 11-3 is connected to the rotating arm of the hypergravity centrifuge via the fixing holes 14-1 and the bolt. An end surface at which the cabin lug 11-3 and the hoisted sealed cavity 11-7 are connected to each other is provided with a third screw hole 14-2. The bolt passes through the third screw hole 14-2 to be connected to the hoisted sealed cavity 11-7, so that the cabin lug 11-3 is connected to the hoisted sealed cavity 11-7 via the third screw hole 14-2 and the bolt. An outer sidewall of the hoisted sealed cavity 11-7 is provided with a vacuum interface 11-4, and the vacuum interface 11-4 is directly connected to a vacuum pipeline outside the hoisted sealed cabin 1. A wiring bracket 16 is fixedly mounted at a bottom surface in the cavity of the hoisted sealed cavity 11-7. As shown in FIG. 2 and FIG. 3, the vacuum interface 11-4, a wiring hole 17-1, and a mounting hole 17-2 are provided on the outer sidewall of the hoisted sealed cavity 11-7. A wiring level 15 is mounted at the wiring hole 17-1. The wiring level 15 is connected to a strong-current wire on the wiring bracket 16 on the inside of the hoisted sealed cavity 11-7 via the wiring hole 17-1. A weak signal control wire is connected to a weak signal control wire on the wiring bracket 16 via the mounting hole 17-2.

The vacuum interface 11-4 is used to be connected to a suction interface of a vacuum system, a pressure gauge interface monitoring a pressure in the furnace, and a safety valve interface controlling the pressure in the furnace. The wiring level 11-5 is used to be connected to the heating system cable. The wiring bracket 11-6 provides a wiring bracket for a high-temperature device in a hypergravity environment to solve issues such as of heating, heat preservation, and temperature control during the process of hypergravity coagulation.

The main function of the bearing frame 2 is to support tensile force and withstand a centrifugal force generated by the sample itself. The bearing frame 2 has a circular arc boss structure and is mounted on the inside the hoisted sealed cabin 1. A stepped surface is machined on the inner wall of the hoisted sealed cabin 1. The outer edge of the bearing frame 2 is fixed on the stepped surface by a bolt and is covered above the high-temperature furnace 3 to mount the bearing frame 2. Considering the use process and environment thereof, the bearing frame 2 is designed as an entire arc structure to increase strength, and the surface is aged by a nitriding treatment to increase hardness and strength thereof to withstand high temperature and hypergravity so as to prevent deformation under stress.

The main function of the high-temperature furnace 3 is to provide the thermal environment needed for sample testing and is mounted inside the hoisted sealed cabin 1 and covered under the bearing frame 2.

Figure 6:
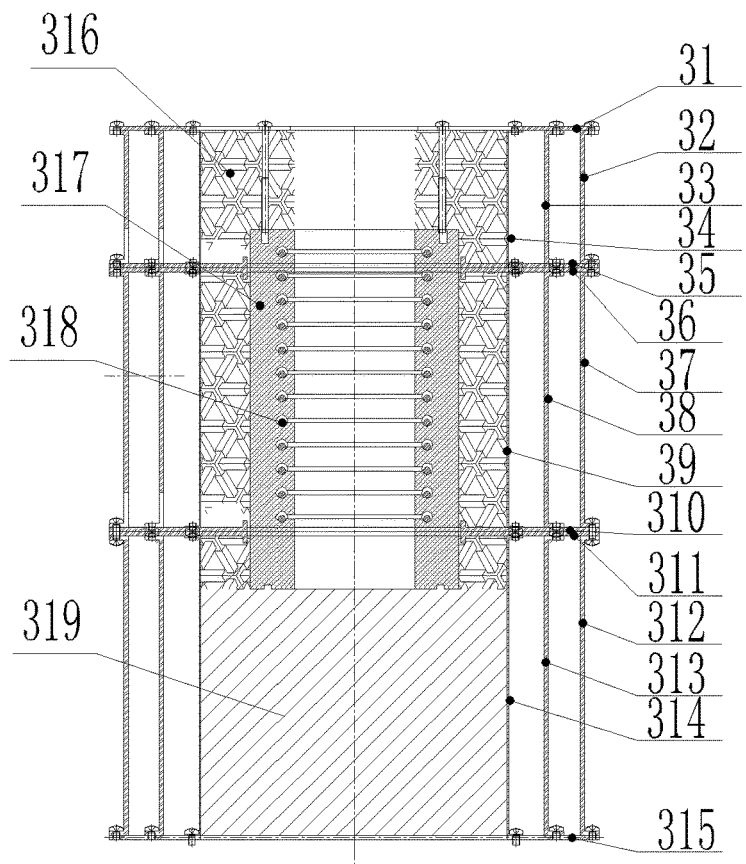
FIG. 6 is a front view of a high-temperature heating device.

As shown in FIG. 6, the high-temperature furnace 3 is fixed in a hypergravity test cabin, and the high-temperature furnace 3 includes, arranged and connected in order from top to bottom, an upper furnace, a middle furnace, a lower furnace, a heat insulation layer 316, a high-strength furnace tube 317, a heating element 318, and a furnace carrier 319. An upper heat insulation cover 31, an upper cavity outer casing 32, an upper cavity middle casing 33, an upper cavity heat insulation layer 34, an upper cavity lower fixing cover 35, a middle heat insulation cover 36, a middle cavity outer casing 37, a middle cavity middle casing 38, a middle cavity heat insulation layer 39, a middle cavity lower fixing cover 310, a lower heat insulation cover 311, a lower cavity outer casing 312, a lower cavity middle casing 313, a lower cavity heat insulation layer 314, and a lower cavity lower fixing cover 315 form an outer casing of a cylindrical high-temperature furnace 3 composed of three furnace bodies mainly used to fix the high-temperature furnace 3 in a hypergravity environment and having the effect of protecting the furnace in a hypergravity environment, thus forming a high-temperature furnace.

The upper furnace is mainly composed of the upper heat insulation cover 31, the upper cavity outer casing 32, the upper cavity middle casing 33, the upper cavity heat insulation layer 34, and the upper cavity lower fixing cover 35. The upper cavity outer casing 32, the upper cavity middle casing 33, and the upper cavity heat insulation layer 34 are respectively mounted from the outside to the inside to form an upper furnace three-layer structure. The upper heat insulation cover 31 and the upper cavity lower fixing cover 35 are respectively mounted at an upper end and a lower end of the upper furnace three-layer structure so that the upper furnace three-layer structure is fixedly connected. The upper heat insulation cover 31 is used to fix the upper furnace three-layer structure of the upper furnace and has the effect of heat insulation. There is a gap both between the upper cavity outer casing 32 and the upper cavity middle casing 33 and between the upper cavity middle casing 33 and the upper cavity heat insulation layer 34 as an air heat insulation layer. The air heat insulation layer has the effect of heat insulation to prevent heat loss in the furnace.

The middle furnace is mainly composed of the middle heat insulation cover 36, the middle cavity outer casing 37, the middle cavity middle casing 38, the middle cavity heat insulation layer 39, and the middle cavity lower fixing cover 310. The middle cavity outer casing 37, the middle cavity middle casing 38, and the middle cavity heat insulation layer 39 are respectively mounted from the outside to the inside to form a middle furnace three-layer structure. The middle heat insulation cover 36 and the middle cavity lower fixing cover 310 are respectively mounted on an upper end and a lower end of the middle furnace three-layer structure so that the middle furnace three-layer structure is fixedly connected. The middle heat insulation cover 36 is used to fix the middle furnace three-layer structure of the middle furnace and has the effect of heat insulation. The middle heat insulation cover 36 has the effect of heat insulation, preventing the heat from being transmitted downward under the effect of hypergravity. There is a gap both between the middle cavity outer casing 37 and the middle cavity middle casing 38 and between the middle cavity middle casing 38 and the middle cavity heat insulation layer 39 as an air heat insulation layer. The air heat insulation layer has the effect of heat insulation to prevent heat loss in the furnace. The upper cavity lower fixing cover 35 of the upper furnace and the middle heat insulation cover 36 of the middle furnace are fixedly connected by a bolt. The upper cavity lower fixing cover 35 and the middle heat insulation cover 36 are connected to connect the upper furnace and the middle furnace.

The lower furnace is mainly composed of the lower heat insulation cover 311, the lower cavity outer casing 312, the lower cavity middle casing 313, the lower cavity heat insulation layer 314, and the lower cavity lower fixing cover 315. The lower cavity outer casing 312, the lower cavity middle casing 313, and the lower cavity heat insulation layer 314 are respectively mounted from the outside to the inside to form a lower furnace three-layer structure. The lower heat insulation cover 311 and the lower cavity lower fixing cover 315 are respectively mounted at an upper end and a lower end of the lower furnace three-layer structure so that the lower furnace three-layer structure is fixedly connected. The lower heat insulation cover 311 is used to fix the lower furnace three-layer structure of the lower furnace and has the effect of heat insulation. The lower heat insulation cover 311 has a heat insulation effect to prevent heat from being transmitted downward under the effect of hypergravity. The lower cavity lower fixing cover 315 is used to fix the high-temperature furnace 3 at the bottom of the hoisted sealed cabin 1. There is a gap both between the lower cavity outer casing 312 and the lower cavity middle casing 313 and between the lower cavity middle casing 313 and the lower cavity heat insulation layer 314 as an air heat insulation layer, and the air heat insulation layer has the function of heat insulation to prevent heat loss in the furnace. The middle cavity lower fixing cover 310 of the middle furnace and the lower heat insulation cover 311 of the lower furnace are fixedly connected by a bolt. The connection of the middle cavity lower fixing cover 310 and the lower insulation cover 311 is used to connect the middle furnace and the lower furnace.

The entire furnace is strengthened at four places: the upper heat insulation cover 31, the upper cavity lower fixing cover 35, the middle heat insulation cover 36, the middle cavity lower fixing cover 310, the lower heat insulation cover 311, and the lower cavity lower fixing cover 315 to improve the rigidity and strength of the entire furnace in a hypergravity environment to prevent deformation and damage of the furnace during operation. The upper cavity lower fixing cover 35 and the middle heat insulation cover 36, and the middle cavity lower fixing cover 310 and the lower heat insulation cover 311 are connected by a high-strength bolt, thus facilitating mounting and maintenance.

Figure 7:
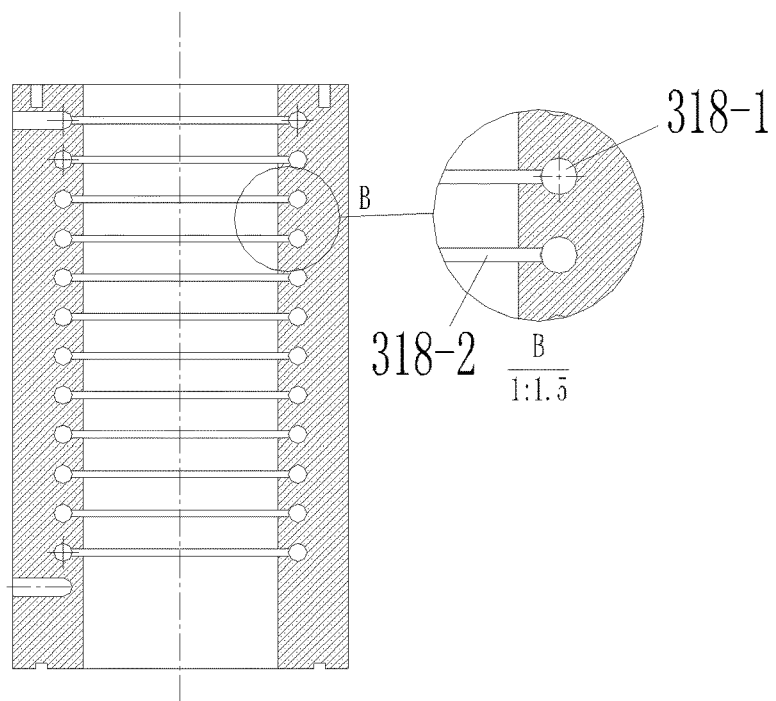
FIG. 7 is a structural cross-sectional view of a high-strength furnace tube 317 and a partially enlarged view thereof.
Figure 8:
FIG. 8 is a diagram of the structure of a heating element.

The furnace carrier 319 is disposed at a bottom of the lower cavity heat insulation layer 314 of the lower furnace. The high-strength furnace tube 317 is disposed on the furnace carrier 319. The furnace carrier 319 is disposed on a bottom surface of the hypergravity test cabin. The furnace carrier 319 is used to support a weight of the entire furnace and a compressive stress generated under the hypergravity effect, and at the same time to insulate heat so as to prevent heat from being transferred to the bottom of the hoisted sealed cabin 1 via heat conduction under hypergravity. The high-strength furnace tube 317 is respectively filled with the heat insulation layer 316 between the upper cavity heat insulation layer 34 of the upper furnace, the middle cavity heat insulation layer 39 of the middle furnace, and the lower cavity heat insulation layer 314 of the lower furnace. A spiral groove 318-1 is machined on the inside of the high-strength furnace tube 317. As shown in FIG. 7, the spiral groove 318-1 is provided with a spiral heating element 318. As shown in FIG. 8, the spiral groove 318-1 is provided with a heat dissipation channel 318-2 on a side facing the inner wall of the high-strength furnace tube 317, and the heat generated by the heating element 318 is uniformly radiated to the center of the high-strength furnace tube 317 via the heat dissipation channel 318-2.

The heating element 318 generates heat during work. The high-strength furnace tube 317 is heated by radiation. A high-temperature area is formed in the center of the high-strength furnace tube 317. A spacing between the heating elements 318 at different height positions in the high-strength furnace tube 317 is changed by changing a pitch of the spiral groove 318-1 at different height positions. The heating temperature at different height positions is changed, so that the forming of a uniform temperature area or a non-uniform temperature gradient area may be realized.

The structural design of the high-strength furnace tube 317 and the heating element 318 of the invention may prevent the heating element 318 from falling off under a hypergravity environment, and the heating effect may also be adjusted by adjusting the pitch of the spiral groove at different positions.

In a specific implementation, the furnace casings 32, 33, 36, 37, 312, and 313 are made of an aerospace light-weight and high-strength material, and are provided with two layers of heat shields and a layer of heat insulation layer. The vacuum environment is used to prevent heat radiation and effectively prevent high temperature conduction.

The heat insulation layer 316 is composed of a material with low thermal conductivity and adopts mullite to prevent heat from being transferred to the outside of the furnace via conduction.

The high-strength furnace tube 317 is made of a ceramic with high strength and low thermal conductivity.

Spiral groove pitch of high-strength furnace tube 317 processing: the heating element 318 is readily pulled up and deformed or even broken under the condition of hypergravity. In addition to the layout design of the heating element 318, a series of changes and effects caused by the heating element 318 needs be considered, such as preventing the deformation and movement of the heating element 318 under a hypergravity condition (breaking in severe cases), thus affecting the overall operation of the device.

Selection of the heating element 318: the maximum allowable temperature of different heating elements 318 is different from the requirements of the use environment. The type of the heating element 318 needs to be determined in conjunction with the specific use conditions of this device (maximum working temperature, vacuum environment, and hypergravity environment). Examples include iron chromium aluminum electric heating alloy wire and platinum wire and the like.

In order to prevent the deformation of the high-strength furnace tube 317 due to its own weight under hypergravity, the furnace of the high-temperature furnace 3 is designed in the form of a three-layer split, each layer of which is separately reinforced and insulated.

The furnace carrier 319 supports the weight of the entire high-strength furnace tube 317 and the heat insulation layer and the hypergravity generated in the sample process. The furnace carrier 319 is fixed to the bottom of the hoisted sealed cabin 1 by a high-strength bolt.

When the high-temperature furnace 3 is mounted and used, first the lower cavity lower fixing cover 315 is fixed to the bottom of the hoisted sealed cabin 1 by a bolt. The furnace carrier 319 is mounted on the lower cavity lower fixing cover 315. The lower cavity outer casing 312, the lower cavity middle casing 313, and the lower cavity heat insulation layer 314 are connected to the lower cavity lower fixing cover 315 by a bolt. The lower heat insulation cover 311 is connected to the middle cavity lower fixing cover 310 by a bolt. The middle cavity middle casing 38, the middle cavity heat insulation layer 39, and the middle cavity lower fixing cover 310 are connected to the middle cavity lower fixing cover 310 by a bolt, and then are connected to the upper cavity lower fixing cover 35 and the middle heat insulation cover 36 by a bolt.

The heat insulation layer 316 of the mullite is directly disposed between the high-strength furnace tube 317 of a ceramic and the lower cavity heat insulation layer 314, the middle cavity heat insulation layer 39, and the upper cavity heat insulation layer 34. The heat insulation layer 316 of the mullite may not only serve as a buffer but also isolate heat.

The high-temperature furnace 3 may be used repeatedly, and different experimental requirements may be met by only adopting a suitable heating element 318 and high-strength furnace tube 317, and has the advantages of simple structure and higher safety factor.

The main function of the mechanical test device 4 is to provide the mechanical environment needed for sample testing and to fix the sample.

Figure 9:
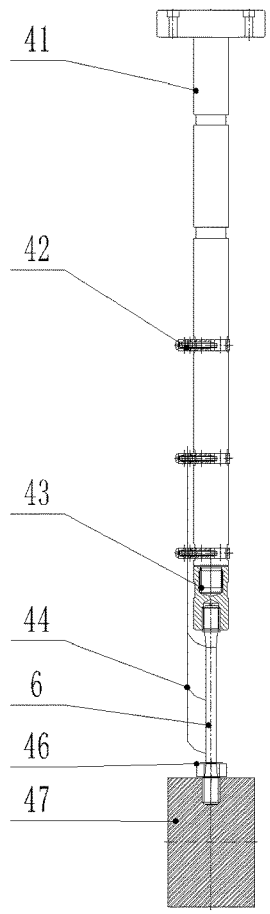
FIG. 9 is a front view of a mechanical test device 4.

As shown in FIG. 9, the mechanical test device 4 is disposed in a hypergravity test cabin. The mechanical test device 4 includes a tie-rod 41, a fixed wire structure 42, a chuck 43, a thermocouple 44, a tightening nut 46, and a surface force loading block 47. A top end of the tie-rod 41 is fixedly connected to the center of the top end of the bearing frame 2 in the hoisted sealed cabin 1. The tie-rod 41 is mainly used to withstand the tensile stress generated by the volume force and surface force coupling effect during the material performance test. A bottom end of the tie-rod 41 is connected to the upper end of the sample 6 via the chuck 43 to fix the sample 6. The sample 6 is a sample of mechanical performance of a material to be tested. The sample 6 has an external thread at a lower end. The external thread of the lower end of the sample 6 is screwed into a threaded hole of the surface force loading block 47 and is tightly connected by the tightening nut 46. The sample 6 and the surface force loading block 47 are connected via the tightening nut 46. The tightening nut 46 is used to connect the sample 6 and the surface force loading block 47. The surface force loading block 47 is specifically a block structure with adjustable own weight. The surface force loading block 47 applies a centrifugal force generated by its own weight to the sample 6 in a hypergravity environment. Different surface forces are applied to the sample 6 via the surface force loading blocks 47 of a different weight combined with the centrifugal force of the centrifuge at a different rotation speed. A lower end surface of the surface force loading block 47 is disposed on a buffer device. The buffer device is disposed at the bottom of the hypergravity test cabin. The specific implementation of the buffer device adopts a buffer block. The buffer device prevents the sample 6 from breaking and damaging the sample cabin during mechanical performance testing. Detection ends of three thermocouples 44 are welded at different positions of the sample 6 to test the experimental temperature of the sample 6. Strain gauges are mounted and welded on the sample 6. The thermocouples 44 and strain gauges are used to test the experimental temperature and strain. An output end of the three thermocouples 44 and the strain gauges is led out by a wire and connected to an external signal collector. A plurality of fixed wire structures 42 are mounted in a middle of the tie-rod 41. The wire is led out via the fixed wire structure 42 and fixed in position. A lower portion of the tie-rod 41 and the sample 6 are disposed in the high-strength furnace tube 317 of the high-temperature furnace 3. The surface force loading block 47 is extended through the high-strength furnace tube 317 of the high-temperature furnace 3 into an upper support of the buffer device 5.

Figure 10:
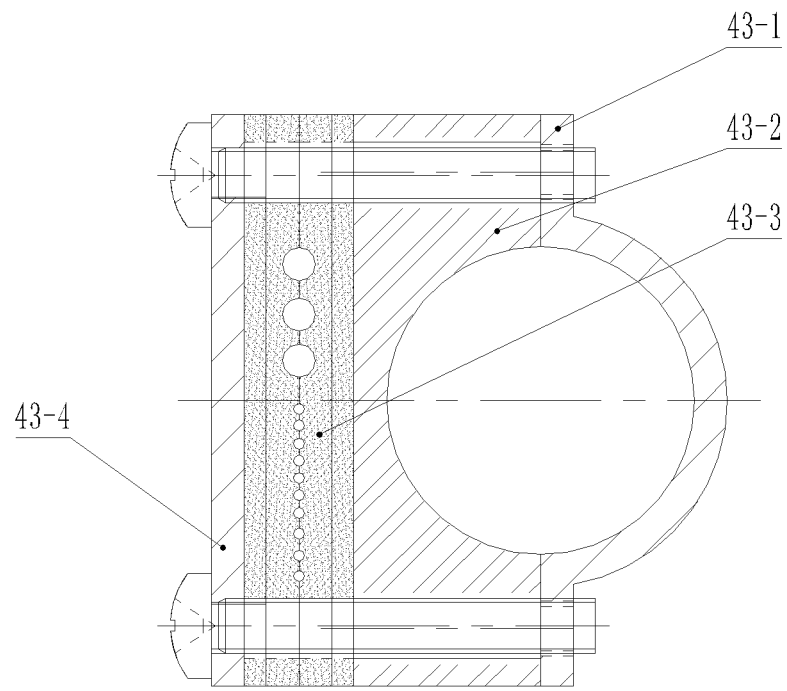
FIG. 10 is a diagram of a fixed wire structure.
Figure 11:
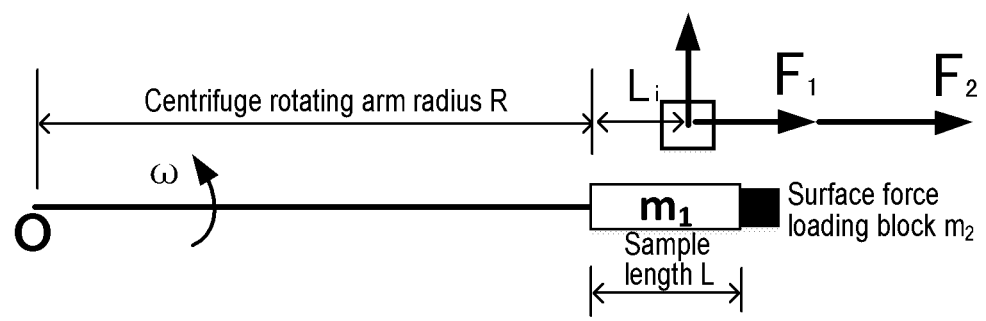
FIG. 11 is a diagram of the principle of force application under a hypergravity material performance testing system of the invention.

As shown in FIG. 10, the fixed wire structure 42 includes a first fixing ring 43-1, a second fixing ring 43-2, a fixed porcelain seat 43-3, and a porcelain seat protector 43-4. Both the first fixing ring 43-1 and the second fixing ring 43-2 have a semi-circular gap, and the first fixing ring 43-1 and the second fixing ring 43-2 are connected to each other between the semi-circular gaps to form a circular opening sleeved outside the tie-rod 41, and the tie-rod 41 is a cylindrical rod. The porcelain seat protector 43-4 is fixed to a side surface of the second fixing ring 43-2 by a bolt on both sides. A fixed porcelain seat 43-3 is interposed between the porcelain seat protector 43-4 and the second fixing ring 43-2. The bolt also passes through the fixed porcelain seat 43-3. The fixed porcelain seat 43-3 is provided with a hole for an output wire of the thermocouples 44 and strain gauges to pass through.

The fixed wire structure 42 is used to fix extension wires of the thermocouples and the strain gauges to prevent them from breaking during a mechanical test.

An upper end surface and a lower end surface of the chuck 43 are provided with a threaded hole. An external thread of the bottom end of the tie-rod 41 is screwed into the threaded hole of the upper end surface of the chuck 43 connected thereto. The sample 6 also has an external thread at an upper end. The external thread of the upper end of the sample 6 is screwed into the threaded hole of the upper end surface of the chuck 43 connected thereto, so that the bottom end of the tie-rod 41 is connected to the upper end of the sample 6 via the chuck 43. The chuck 43 is used to fix the sample 6 and is mainly used to withstand tensile stress generated by the volume force and surface force coupling effect during the material performance test.

The top end of the tie-rod 41 is provided with an outer flange. A fixing screw hole for connecting a bearing device of the material mechanical performance test cabin is provided on the outer flange. The bolt passes through the fixing screw hole to fix the top end of the tie-rod 41 to the bearing device of the material mechanical performance test cabin.

In a specific implementation, the buffer device 5 adopts the technical solution of the invention content in the Chinese patent with the application date of 2019 Apr. 10 and the application number of 2019102853393, with the invention title "A Buffer Device for Capturing High-Temperature Fly-Break Samples in a Hypergravity Environment". The buffer device 5 is disposed inside the furnace carrier 319 of the high-temperature furnace 3 or replaces the furnace carrier 319. A port of the upper support 3 faces upward/towards the mechanical test device 4 to receive the sample broken from the mechanical test device 4, and placing the sample causes damage to the bottom of the hoisted sealed cabin 1.

Specifically implemented samples may commonly include the standard endurance, tensile, creep, and fatigue samples.

Use and operation process of the device of the invention:

A creep sample is taken as an experimental target, and an experimental scene is taken as an example for description.

Before the experiment, a heating temperature of the high-temperature furnace 3, a rotation speed of a centrifugal host, and a mass of the surface force loading block 47 are determined according to experimental temperature, volume force, and surface force. The following describes the use and operation process of the invention in detail:

Step 1: according to experimental conditions, the heating temperature of the high-temperature furnace 3, the rotation speed of the centrifugal host, and the mass of the surface force loading block 47 are determined.

Step 2: according to a size of the sample 6, a size of the chuck 43 and a lock nut is determined.

Step 3: the sample 6 is first connected to the tie-rod 41 via the chuck 43, and then is connected to the surface force loading block 47 via the lock nut.

Step 4: three strain gauges are welded on the sample 6 in sequence for testing a strain of the sample 6 during the experiment; a thermocouple is welded to measure and control a temperature of the high-temperature furnace 3.

Step 5: the mechanical test device 4 is mounted on the bearing frame 2 via a nut.

Step 6: the hoisted sealed cabin 1 is articulated with the rotating arm of the hypergravity centrifuge via the cabin lug 11-3.

Step 7: three strain gauges and one thermocouple extension wire welded on the sample 6 are connected to the cabin interface 1-1 along the tie-rod 41, and then connected to a ground testing system via an electric slip ring connection on a main shaft.

Step 8: a vacuum system is started so that a vacuum degree in the hoisted sealed cabin 1 reaches $10^{-2}$ Pa.

Step 9: after the vacuum degree in the hoisted sealed cabin 1 reaches $10^{-2}$ Pa, the heating of the high-temperature furnace 3 is started.

Step 10: after the temperature of the high-temperature furnace 3 reaches an experimentally set temperature, the centrifugal host is started.

Step 11: after the rotation speed of the centrifugal host reaches an experimentally set rotation speed, a mechanical performance test environment of a volume force-surface force-temperature coupling effect is formed in the high-temperature furnace 3.

Step 12: during the experiment, temperature and strain signals are transmitted to a signal collector in real time. The signal collector converts obtained analog signals into digital signals, and then is connected to a signal slip ring via a wiring rack, and lastly is connected to a ground measurement and control center to obtain a stress-strain curve of sample 6 during the experiment.

A working process of the mechanical performance test of the device of the invention is as follows:

Step 1: the sample 6 is connected to the lower end of the tie-rod 41 via the chuck 43, and the thermocouples 44 and the strain gauges are welded onto the sample 6;

Step 2: then, the hypergravity experiment cabin is disposed in a hanging basket of the centrifuge, a high-temperature furnace is disposed in the hypergravity experiment cabin, the buffer device 5 is disposed at the bottom of the inner cavity of the high-temperature furnace, the bearing frame 2 is disposed at the top of the inner cavity of the high-temperature furnace 3, the mechanical test device 4 is disposed between the bearing frame of the inner cavity of the high-temperature furnace and the buffer device, and the sample 6 that needs to be heated is mounted;

Step 3: a wire of the thermocouple welded to a surface of the sample 6 for temperature measurement is connected to a signal collector, the signal collector receives analog signals of temperature and strain, and converts the analog signals into digital signals;

Step 4: three strong current independent circuits on a ground are respectively connected to upper, middle, and lower heating areas of the high-strength furnace tube 317 of the high-temperature furnace 3, so that the upper, middle, and lower three heating areas of the high-strength furnace tube 317 of the high-temperature furnace 3 are independently heated, and different heating temperatures are configured in different heating areas;

The temperature control is specifically as follows: a sample to be tested for mechanical performance is mounted in the high-strength furnace tube 317 of the high-temperature furnace 3, and a temperature sensor is provided. The temperature sensor is connected to a signal collector. A wire output by the signal collector is connected to a weak signal conductive slip ring via a wiring rack, and then connected to a ground measurement and control center. The high-temperature furnace 3 is provided with a three-way independent strong current circuit. The three-way strong-current independent circuit controls the heating of the heating elements 318 at different heights in the interior for high-temperature heating, and connects the three strong-current independent circuits on the ground to the wiring rack of the hypergravity experiment cabin via the conductive slip ring of the main shaft of the centrifuge. The conductive slip ring of the main shaft of the centrifuge is connected to a power supply cabinet. That is, the first strong current independent circuit is connected to a heating area on the high-temperature furnace 3 via the wiring rack, the second strong current independent circuit is connected to a heating area in the high-temperature furnace, and the third strong current independent circuit is connected to a heating area of the high-temperature furnace.

In a specific implementation, three independent temperature-controlling temperature extension wires controlling the high-temperature furnace 3 are connected to the signal collector, and the signal collector converts a received temperature signal from an analog signal to a digital signal; the digital signal is connected to the signal slip ring via the wiring rack, and then connected to the ground measurement and control center.

The high-strength furnace tube 317 is used as a furnace tube, heat is generated by a heating wire, and the high-strength furnace tube 317 is heated by heat conduction. The required temperature gradient and an average temperature area of the high-strength furnace tube 317 are realized by a heating wire layout forming a uniform temperature field in the furnace chamber, and at the same time withstands the pressure generated by the high-strength furnace tube 317 due to the hypergravity process and avoids the thermal effects of heat conduction to peripheral components. The furnace temperature is controlled by a temperature sensor fixed or welded on a sample to be measured via a temperature controller and a measurement and control system.

Step 5: a tachometer is mounted on a rotating shaft of the centrifuge, a tachometer signal line mounted on the rotating shaft of the centrifuge is connected to a weak signal conductive centrifuge main shaft conductive slip ring, a real-time temperature and a heating rate of the high-temperature furnace are controlled using three thermocouples on the heating device, a rotation speed of the centrifuge is controlled using the tachometer, and a stress F applied to the sample 6 is calculated using the following formula:

$$F = m \cdot a = m \cdot R(2\pi N/60)^2$$

In particular, m is a mass of the sample 6; a is a centrifugal acceleration, R is an effective distance from the sample 6 to an axis of rotation of the centrifuge; and N is the rotation speed of the centrifuge.

In a sample test process of the invention, a stress state of the sample is: a centrifugal stress generated by a temperature and a self-weight and a surface force generated by the surface force loading block at the same time, and then a stress-strain curve of the sample under the stress state is drawn in real time.

In the invention, the temperature of three different areas of the high-temperature furnace 3 may be independently controlled via a thermocouple to realize uniform temperature heating or gradient heating, so that a distribution of the configured temperature may be adjusted.

Testing is performed by the mechanical test device 4 with the following working methods:

(1) By welding strain gauges in a working section of a sample, a stress-strain curve of the sample under stress may be obtained in real time, and then a dynamic stress-strain curve of the material under a centrifugal force-high temperature coupling effect may be tested to obtain mechanical performance results of the material;

(2) During an experiment, a centrifugal force may be dynamically changed by controlling a rotation speed so as to be applied to a surface force on the sample;

(3) By changing a surface force loading block weight, a surface force applied on the sample is changed;

(4) Different temperatures in three areas of a heating device may be independently controlled by a thermocouple to achieve uniform temperature heating or gradient heating, so as to configure a temperature distribution of the sample 6 as needed.

What is claimed is:

1. A material performance testing system under a fixed multi-field coupling effect in a hypergravity environment, comprising a hoisted sealed cabin, a bearing frame, a high-temperature furnace, a mechanical test device, and a buffer device; the bearing frame and the high-temperature furnace are fixedly mounted on an inside of the hoisted sealed cabin, the bearing frame is covered on the high-temperature furnace, the buffer device is mounted at a bottom in the high-temperature furnace, an upper end and a lower end of the mechanical test device are connected in a top of the bearing frame and a bottom of the high-temperature furnace, and a sample is connected and mounted to an end of the mechanical test device;

the high-temperature furnace is fixed in a hypergravity test cabin, the high-temperature furnace comprises an upper furnace, a middle furnace, a lower furnace, and a heat insulation layer, a high-strength furnace tube, a heating, and a furnace carrier arranged in order from top to bottom, the upper furnace is composed of an upper heat insulation cover, an upper cavity outer casing, an upper cavity middle casing, an upper cavity heat insulation layer, and an upper cavity lower fixing cover, the upper cavity outer casing, the upper cavity middle casing, and the upper cavity heat insulation layer are respectively mounted from an outside to an inside to form an upper furnace three-layer structure, the upper heat insulation cover and the upper cavity lower fixing cover are respectively mounted on an upper end and a lower end of the upper furnace three-layer structure so that the upper furnace three-layer structure is fixedly connected, there is a gap as an air heat insulation layer between the upper cavity outer casing and the upper cavity middle casing and between the upper cavity middle casing and the upper cavity heat insulation layer, the middle furnace is composed of a middle heat insulation cover, a middle cavity outer casing, a middle cavity middle casing, a middle cavity heat insulation layer, and a middle cavity lower fixing cover, the middle cavity outer casing, the middle cavity middle casing, and the middle cavity heat insulation layer are respectively mounted from an outside to an inside to form a middle furnace three-layer structure, the middle heat insulation cover and the middle cavity lower fixing cover are respectively mounted on an upper end and a lower end of the middle furnace three-layer structure so that the middle furnace three-layer structure is fixedly connected, there is a gap as an air heat insulation layer between the middle cavity outer casing and the middle cavity middle casing and between the middle cavity middle casing and the middle cavity heat insulation layer, the upper cavity lower fixing cover of the upper furnace and the middle heat insulation cover of the middle furnace are fixedly connected, the lower furnace is composed of a lower heat insulation cover, a lower cavity outer casing, a lower cavity middle casing, a lower cavity heat insulation layer, and a lower cavity lower fixing cover, the lower cavity outer casing, the lower cavity middle casing, and the lower cavity heat insulation layer are respectively mounted from an outside to an inside to form a lower furnace three-layer structure, the lower heat insulation cover and the lower cavity lower fixing cover are respectively mounted on an upper end and a lower end of the lower furnace three-layer structure so that the lower furnace three-layer structure is fixedly connected, there is a gap as an air heat insulation layer between the lower cavity outer casing and the lower cavity middle casing and between the lower cavity middle casing and the lower cavity heat insulation layer, the middle cavity lower fixing cover of the middle furnace and the lower heat insulation cover of the lower furnace are fixedly connected, the furnace carrier is disposed at a bottom of the lower cavity heat insulation layer of the lower furnace, the high-strength furnace tube is disposed on the furnace carrier, the heat insulation layer is respectively filled between an outside of the high-strength furnace tube and the upper cavity heat insulation layer of the upper furnace, the middle cavity heat insulation layer of the middle furnace, and the lower cavity heat insulation layer of the lower furnace, a spiral groove is machined on an inside of the high-strength furnace tube, the spiral groove is provided with a spiral heating element, the spiral groove is provided with a heat dissipation channel on a side facing an inner wall of the high-strength furnace tube, and the heat generated by the spiral heating element is uniformly radiated to a center of the high-strength furnace tube via the heat dissipation channel;

the mechanical test device is disposed in the hypergravity test cabin, the mechanical test device comprises a tie-rod, a fixed wire structure, a chuck, a thermocouple, a tightening nut, and a surface force loading block, a top of the tie-rod is fixedly connected to a center of the top of the bearing frame in the hoisted sealed cabin, the tie-rod is used to withstand a tensile stress generated by a volume force and surface force coupling effect during a material performance test, a bottom end of the tie-rod is connected to an upper end of the sample via the chuck, and the sample is a sample of mechanical performance of a material to be tested, a lower end of the sample is provided with an external thread, and the external thread at the lower end of the sample is screwed into a threaded hole of the surface force loading block and fastened and connected by the tightening nut, the surface force loading block is a block structure with adjustable own weight, and different surface force forces are applied to the sample via the surface force loading block of a different weight combined with a centrifugal force of a hypergravity centrifuge at a different rotation speed, a lower end surface of the surface force loading block is disposed on a buffer device, and the buffer device is disposed at a bottom of the hypergravity test cabin, detection ends of three thermocouples are welded at different positions of the sample, strain gauges are mounted and welded on the sample, output ends of the three thermocouples and the strain gauges are led out by a wire and connected to an external signal collector, a plurality of fixed wire structures are mounted in a middle of the tie-rod, and the wire is led out via the fixed wire structures and fixed in position, a lower portion of the tie-rod and the sample are disposed in the high-strength furnace tube of the high-temperature furnace, and the surface force loading block is extended through the high-strength furnace tube of the high-temperature furnace into the buffer device.

2. The material performance testing system under the fixed multi-field coupling effect in the hypergravity environment of claim 1, wherein the hoisted sealed cabin comprises an upper sealing dome and a hoisted sealed cavity, a cavity is provided inside the hoisted sealed cavity, an opening is formed at an upper end of the cavity, sidewalls on both sides of the hoisted sealed cavity are connected outward with a cabin lug, the cabin lugs on both sides are hingedly connected to a rotating arm of a hanging basket of the hypergravity centrifuge, the upper sealing dome is connected to an opening end surface of the cavity of the hoisted sealed cavity via bolt mounting and is connected by sealing, a cabin interface member is mounted in a center of the upper sealing dome, the cabin interface member comprises an upper glass press-fit flange, an upper flange fastening screw, a quartz glass, and a vacuum socket, the quartz glass is fixed and mounted at an opening of a center at a top of a communication upper sealing cabin cover via the upper glass press-fit flange, the upper glass press-fit flange is fixed to the top of the communication upper sealing cabin cover by the upper flange fastening screw, an opening is formed at a bottom of a communication cabin, and a vacuum socket is mounted at the opening.

3. The material performance testing system under the fixed multi-field coupling effect in the hypergravity environment of claim 2, wherein an outer edge of the upper sealing dome is provided with a second screw hole, and a bolt passes through the second screw hole and is connected to the hoisted sealed cavity, so that the upper sealing dome is connected to the hoisted sealed cavity.

4. The material performance testing system under the fixed multi-field coupling effect in the hypergravity environment of claim 2, wherein a plurality of spaced fixing holes are provided at a surface of a lug portion of the cabin lugs extended radially, and a bolt passes through the fixing hole to be connected to the rotating arm of the hypergravity centrifuge, so that the cabin lugs are connected to the rotating arm of the hypergravity centrifuge via the fixing holes and the bolt.

5. The material performance testing system under the fixed multi-field coupling effect in the hypergravity environment of claim 2, wherein an outer sidewall of the hoisted sealed cavity is provided with a vacuum interface, the vacuum interface is directly connected to a vacuum pipeline outside the hoisted sealed cabin, a wiring bracket is fixedly mounted at a bottom surface in the cavity of the hoisted sealed cavity, a vacuum interface, a wiring hole, a mounting hole are provided on the outer sidewall of the hoisted sealed cavity, a wiring level is mounted at the wiring hole, the wiring level is connected to the wiring bracket on an inside of the hoisted sealed cavity via the wiring hole, a weak signal control wire is connected to the wiring bracket via the mounting hole.

6. The material performance testing system under the fixed multi-field coupling effect in the hypergravity environment of claim 1, wherein the bearing frame is a circular arc boss structure and is mounted on an inside of the hoisted sealed cabin, a stepped surface is machined on an inner wall of the hoisted sealed cabin, and an outer edge of the bearing frame is fixed on the stepped surface by a bolt and covered above the high-temperature furnace.

7. The material performance testing system under the fixed multi-field coupling effect in the hypergravity environment of claim 1, wherein the fixed wire structure comprises a first fixing ring, a second fixing ring, a fixed porcelain seat, and a porcelain seat protector, both the first fixing ring and the second fixing ring have a semi-circular gap, the first fixing ring and the second fixing ring are connected to each other between the semi-circular gaps to form a circular opening sleeved outside the tie-rod, the porcelain seat protector is fixed to a side surface of the second fixing ring by a bolt, the fixed porcelain seat is interposed between the porcelain seat protector and the second fixing ring, and the fixed porcelain seat is provided with a hole for an output wire of the thermocouple and the strain gauges to pass through.

8. The material performance testing system under the fixed multi-field coupling effect in the hypergravity environment of claim 7, wherein an upper end surface and a lower end surface of the chuck are provided with a threaded hole, an external thread at the bottom end of the tie-rod is screwed into a threaded hole at an upper end surface of the chuck connected to the chuck, an external thread is also provided at the upper end of the sample, and the external thread at the upper end of the sample is screwed into the threaded hole at the upper end surface of the chuck connected to the chuck.

9. The material performance testing system under the fixed multi-field coupling effect in the hypergravity environment of claim 7, wherein an outer flange is provided at a top end of the tie-rod, the outer flange is provided with a fixing screw hole for connecting a bearing device of a material mechanical performance test cabin, and a bolt passes through the fixing screw hole to fix the top end of the tie-rod to the bearing device of the material mechanical performance test cabin.

* * * * *